United States Patent [19]
Alicea

[11] Patent Number: 5,711,846
[45] Date of Patent: Jan. 27, 1998

[54] SELF MAILING APPARATUS

[75] Inventor: Carlos Alicea, Ronkonkoma, N.Y.

[73] Assignee: Macro Technology International, Inc., Ronkonkoma, N.Y.

[21] Appl. No.: 638,333

[22] Filed: Apr. 26, 1996

[51] Int. Cl.[6] .................................................. B32B 31/00
[52] U.S. Cl. .................... 156/556; 156/479; 156/483; 156/361; 156/542
[58] Field of Search .................... 156/479, 483, 156/216, 542, 556, 361, DIG. 1

[56] References Cited

U.S. PATENT DOCUMENTS

| | | | |
|---|---|---|---|
| 3,245,859 | 4/1966 | Busk | 156/479 |
| 4,004,962 | 1/1977 | Kleid | 156/479 X |
| 5,314,567 | 5/1994 | Noll | 156/542 X |
| 5,376,217 | 12/1994 | Janssen, Jr. et al. | 156/361 |

*Primary Examiner*—James Engel
*Attorney, Agent, or Firm*—Cushman Darby & Cushman IP Group of Pillsbury Madison & Sutro LLP

[57] ABSTRACT

A self mailing apparatus comprises a pair of spaced main side plates; a feeder module for feeding a stack of media being mounted between the main side plates; a registration roller module disposed in front of the feeder module; a tabbing mechanism disposed in front of the feeder module and being pivotably about a pair of first pivot axes rotatably disposed on the main side plates; a labeling mechanism disposed in front of the tabbing mechanism and being pivotably about a second pivot axis rotatably disposed between the main side plates; a media transport mechanism comprising a first roller module disposed in front of the feeder module, a second roller module disposed below the tabbing mechanism, and a third roller module disposed below the labeling mechanism; a first driving means for driving the feeder module and the registration roller module; a second driving means for driving the tabbing mechanism; a third driving means for driving the labeling mechanism; and a fourth driving means for driving the media transport mechanism such that a completely folded self mailer can be tabbed and addressed in succession.

18 Claims, 10 Drawing Sheets

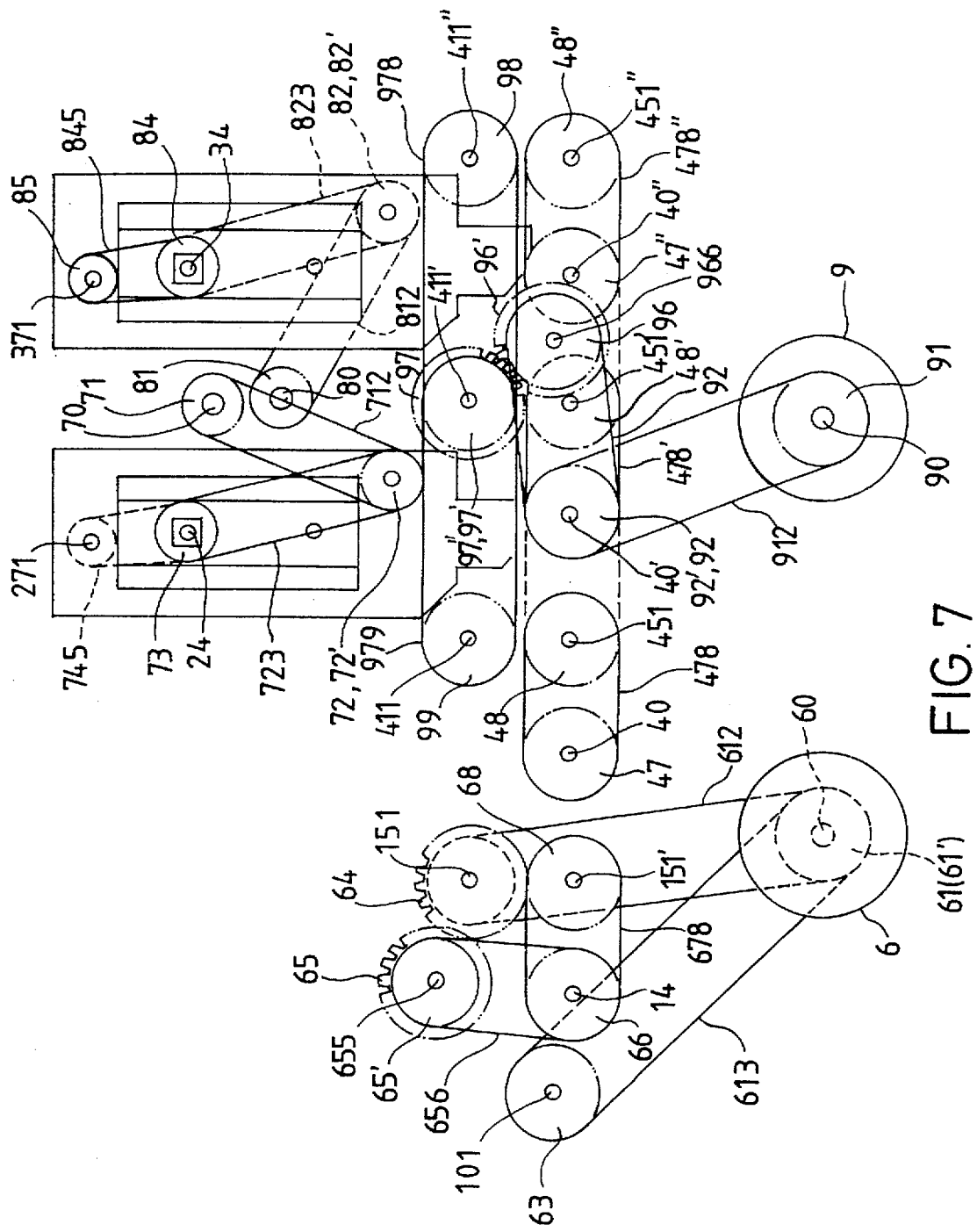

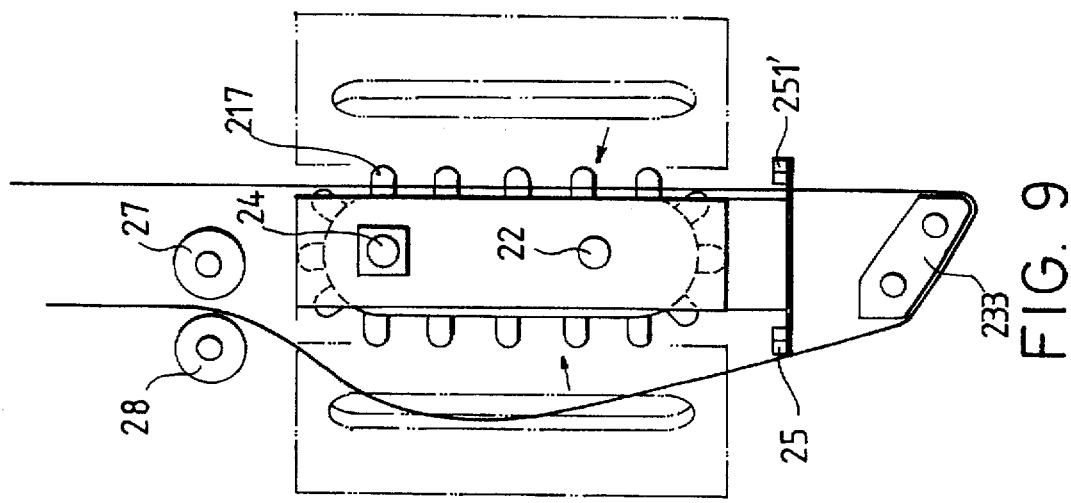
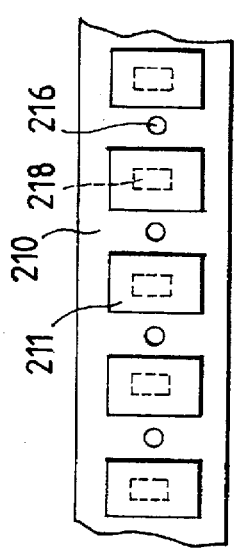
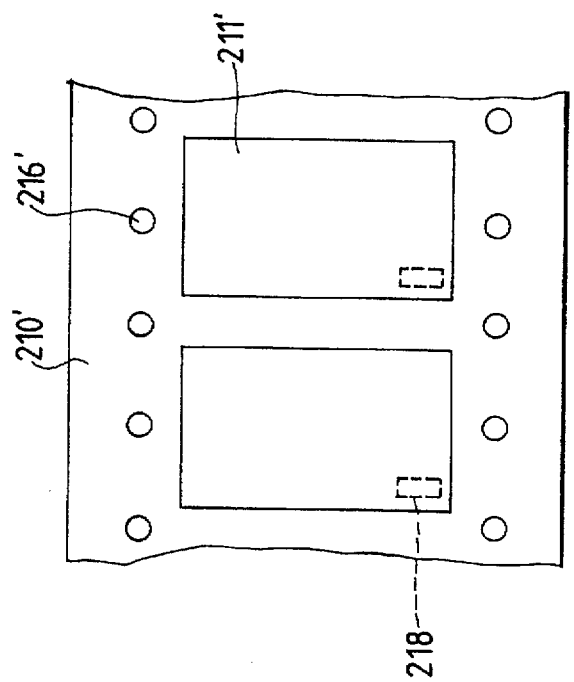

SELF MAILING APPARATUS

BACKGROUND OF THE INVENTION

1. Field of the invention

This invention relates to a self mailing apparatus, in particular, to an apparatus for delivering a completely folded self mailer to be tabbed and addressed.

2. Description of the Prior Art

A self mailer is conventionally defined as a mailing piece without the usage of an envelope. Given a preprinted and prefolded document, a forwarding address and proper seal are required to transform it into a mailing piece. Proper preparation of the address with postnet bar code and with a minimum of one tab (sealer) in accordance with recently published postal regulations, a substantial postage discount is offered by the U.S. Post Office. It stands out as the most economical way to prepare a mailing piece.

For a discount postage rate of a self mailer, the U.S. Post Office requires:

(1) The open end of the folded media must have at least one tab, light weight paper requires two tabs. For one tab, the location of the tab is at the center; for two tabs, the locations of the tabs are no more than one inch away from the sides of the self mailer.

(2) The tabbed side is also the return address side.

(3) Forwarding address must be accompanied by a complete nine digit zip code and for its postnet bar code a representation of eleven digits. Location of the bar code is specified and can be part of the address block or at the right, lower corner of the self mailer.

The commercially available equipment for self mailers can be grouped into a printer, a labeler and a tabber.

The printer is used for address preparation. If printing is done directly on the self mailer, this is conventionally defined as direct impression printing. Alternatively, the address can be printed on an address label which in turn gets stuck onto the mail piece.

Modern automatic address printing devices are usually capable of printing the address and bar code from the command of a computer. However, different printing technologies have their limitations. Laser printing does not print well on an uneven paper surface; ink jet smudges if the media is too smooth and glossy; and dot matrix and daisy wheel are too noisy. Furthermore, all printers have limitations on the thickness of the media to be printed on. In this case, the address label is used. A direct impression printer usually has an automatic paper media feeding device which feeds the bottom piece of the pile to the printer. The media could vary from folded paper, envelope or thin booklet. Printers of this class cost much more than a plain paper printer. A label address printer is far less complicated. A pin fed device is required to feed the label carrier. Bar code printing capability is still limited to certain printers. The printers listed above, except for laser printers, are serial or asynchronous printers, i.e., the motion stops during printing. The laser printer, generally speaking, prints as the paper moves and is designed primarily for printing plain paper.

Equipment which applies a label and tab(s) onto a media is defined as a labeler/tabber respectively. Pertaining to this discussion, the label and/or tab are a pressure sensitive type. They are stuck on a wax coated paper (the carrier) by an adhesive. Label carriers are usually pin fed. Tab carriers can be pin fed like the label carrier or friction roller fed. Friction fed carriers do not have holes on the carriers. Pin feeding is precise and cyclic, and tolerance error does not accumulate. Friction feeding is designed with rubber rollers, slippage and roller manufacturing tolerance make precision control of paper motion difficult. The cost to manufacture either label or tab is greatly dependent on the area of paper material (including the carrier) and increases as the size increases. Commercially available labels are 3.5"×1" and a tab is typically a one inch circle.

A typical desk top labeler consists of a media bottom feed module and a carrier feed module. A media feeder feeds the bottom piece continuously to media transport mechanism, the label carrier fed by a pin fed mechanism releases the label at the label separation point. The leading edge of the label lands on the media and then goes through a set of pressure rollers which presses the label against the media. An optical sensor detects the edge of the label at the separation point.

A typical tabber consists of a media transporting module and a tab feed module. Unlike the labeler, the tab is pre-fed half way and intercepts the leading edge of the paper path. As contact is made by the two, both paper and tab move together to the pressure roller station and the tab wraps around the paper. A prime mover provides power for the media feed and through the clutch and optical sensor it engages and disengages the tabbing mechanism. Tabs can be pin fed or friction roller fed. Pin feeding avoids slippage but uses more carrier paper for pin hole (if pin hole is on the side of the tab) or reduces the adhesive area of the tab (if the hole is in between the tab). Because of the relative small size of the tab as compared with the label, the cost of the tabs heavily depends on the size of the paper. A one inch tab with two pin holes on both sides of the tab has a total area of 2.1 square inch; it has a total area of 1.1 square inch with a hole between the center of the tab, and the adhesive width is reduced to 0.85". Each tabber controls one tab. Two tabs on a single self mailer piece requires two tab modules (or two prime movers).

For existing equipment, it is more economical to use direct impression printing to prepare a self mailer. As explained in the preceding description, a serial printer requires paper stoppage during printing. However, tabbing requires paper motion. Putting a commercially available tabber at the exit of a serial printer will not work properly. If two events of tabbing and printing happen at the same time, then it is logistically conflicting. This is because of the fact that the media transport mechanism of tabber (or labeler) is not designed to stop instantaneously. One needs two complete but different classes of machines to prepare the mailing piece. This arrangement has the following drawbacks:

(1) Duplication of paper feed. Hardware costs go up, and it takes up more space and duplication of feeding is also increased.

(2) Frequently manual intervention or attention is needed.

Using either direct or indirect impression printing method, tabbing is always required. The operation of a current tabber is analyzed as follows:

(1) Speed of the feeder and transport is variable. The feeder speed depends on the weight of the pile and surface condition of the media itself. For a given pile, speed goes up as the media pile decreases. The paper transport speed is a variable because that the power needed to drive the tabbing mechanism is also tapped from the same prime mover through a magnetic clutch device. Using a constant time to engage a magnetic clutch with the mechanism is too uncertain for a precision motion control.

(2) Position of the pre-fed tab depends on the drive method and resolution of the optical sensor being used.

Friction feed invites slippage. Pin feed method gives much better accuracy, but tab carrier is bigger.

(3) Given the above description and the fact that if two tabs are required for a pre-addressed self mailer, one will need a feeder and two independently controlled tab modules. The question arises, then, why does the current product not combine two tab modules into one? The answer to that is "simultaneity." To wrap two tabs around the leading edge evenly while both the media and tabs are moving requires simultaneous contact of the leading edge with the two tabs at the same time. That means the moving leading edge of the media has to be square and straight without going askew and both tabs are precisely halfway out before contact. Unfortunately, the slippage associated with the current frictional drive mechanism makes the simultaneous condition very difficult to attain.

The bottom feeder:

The weight of the pile is partially resting on the rubber feed roller. As the media at the bottom struggles to pass through a narrow gate, a lot of drag forces exerting on this piece. If the drag is not symmetrical to the media, a steering effect takes place on the media and it will exit the feeder askew. Feeding a great variety of media straight is not a simple task. With proper corrections, one can reduce the skew to almost a non-noticeable amount.

The relay of media from feeder to transport mechanism:

As explained before, the dynamic characteristics of feeder device and transport mechanism result in an instantaneous differential speed of the two modules. Media to be bridged across two sets of rollers running at different speeds can make the initial skew become much worse.

If a friction drive is used on the tab, to expect the two tabs from the same shaft to rest half way at the same time is unrealistic. Simultaneous movement can be attained only through a pin-feed mechanism.

Having analyzed the characteristics of the synchronism of the serial printer and tabbing machine respectively, the appraisal of the existing self mailer apparatus involving address label (indirect printing) becomes easier. The labeler works very similar to a tabber. It is synchronous and can be lined up serially with a tabber to complete a self mailer piece. However, the required procedures for setting up a labeler and tabber of a popular unit for a particular job will indicate the dependence on manual effort for the operation. To prepare a self mailer with a label and two tabs, a feeder module and a label module are tied up to a single package defined as a labeler, which is serially lined up with two independent tab modules, the procedures are as follows:

(1) The operator loads a pile of the media on the feeder and adjusts the spacing and orientation of each mechanical entity with respect to each other to get "the best" throughput of the apparatus.

(2) Fine tune the potentiometer of each independent mechanical entity for location of label tab, throughput, etc.

(3) Operator's attention is required to make sure the supply of media (label and tab) is sufficient.

(4) A common practice in the field is to align the labeler with one tab module for one tab, then recycle the media for the second tab.

If the tab or the label is made of optically transparent material, improper arrangement of the optical sensor to trigger the tab drive mechanism would fail. A transparent tab will not interfere with the appearance of a self mail piece.

SUMMARY OF THE INVENTION

It is an object of the present invention to provide a self mailing apparatus comprising a feeder module, a tabbing mechanism, a labeling mechanism, and a media transport mechanism, which are all mounted between a pair of main side plates to minimize operator intervention and redundancy of hardware.

It is another object of the present invention to provide a self mailing apparatus which is far more automatic, easy to operate and approximately weighs one fifth in comparison with the existing assembly.

It is yet another object of the present invention to provide a self mailing apparatus having a feeder module being designed with skew correction capability, and the motion of tabbing is tied in with a media transport mechanism.

It is a further object of the present invention to provide a self mailing apparatus, wherein the simultaneous contacts of more than one tab with the leading edge of media is accomplished by a slippage free tab carrier feeding mechanism.

These and other objects, advantages and features of the present invention will be more fully understood and appreciated by reference to the written specification.

BRIEF DESCRIPTION OF THE DRAWINGS

FIG. 7 is a schematic view illustrating gear trains from stepping motors according to the present invention;

FIG. 8 is a plan view illustrating a tab/carrier combination according to the present invention;

FIG. 9 is a schematic, cross-sectional view of a tabbing mechanism illustrating initial loading of a tab carrier into the tabbing mechanism according to the present invention;

FIG. 12 is a plan view illustrating a wider tab/carrier combination according to the present invention.

DETAILED DESCRIPTION OF THE INVENTION

Referring now to FIGS. 1 through 4, a self mailing apparatus according to the present invention comprises a feeder module 1, a tabbing mechanism 2, a labeling mechanism 3, and a media transport mechanism 4, which are mounted between a pair of main side plates P, P'.

Figure 1:
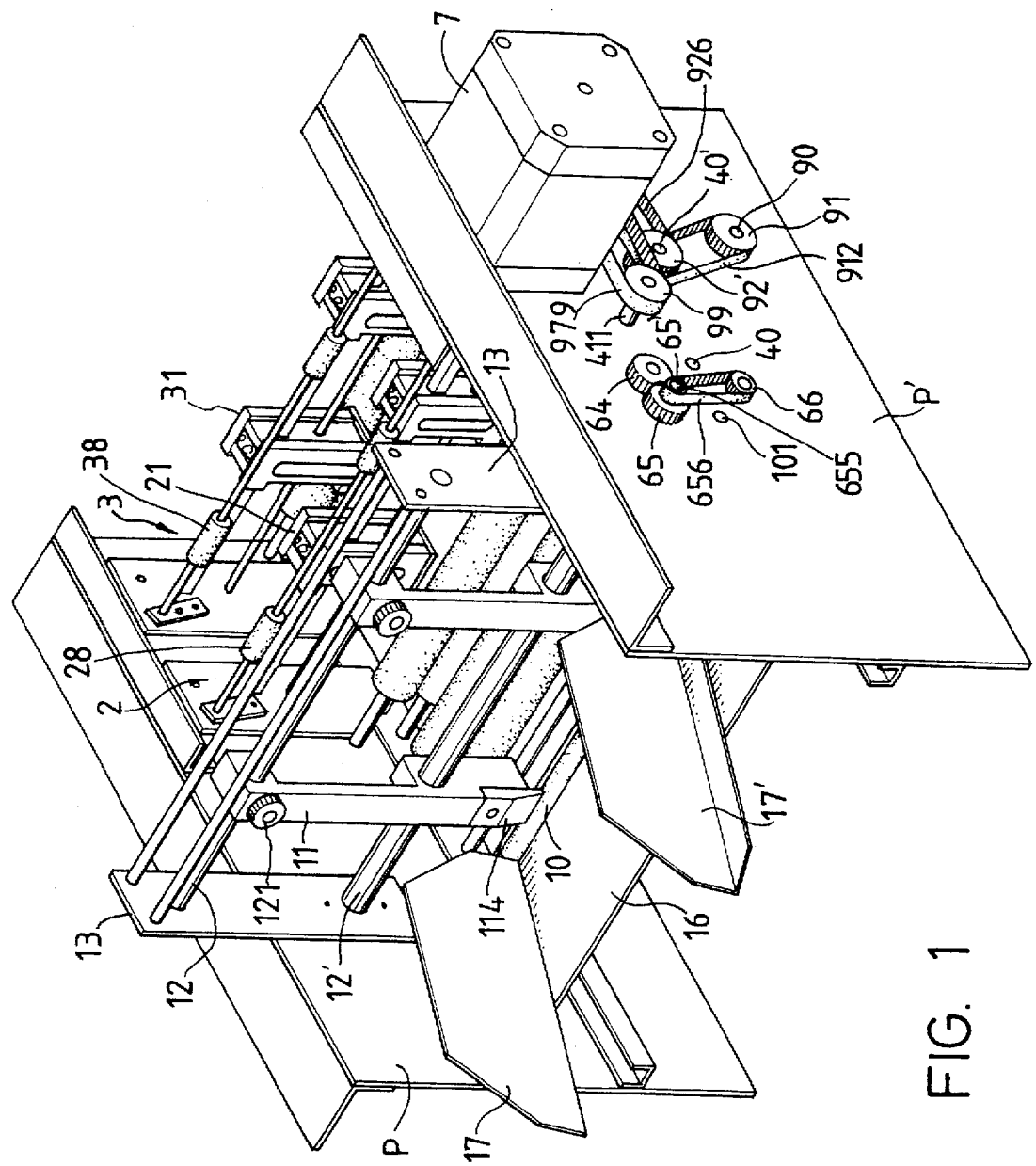
FIG. 1 is a perspective view of a self mailing apparatus according to the present invention.
Figure 2A:
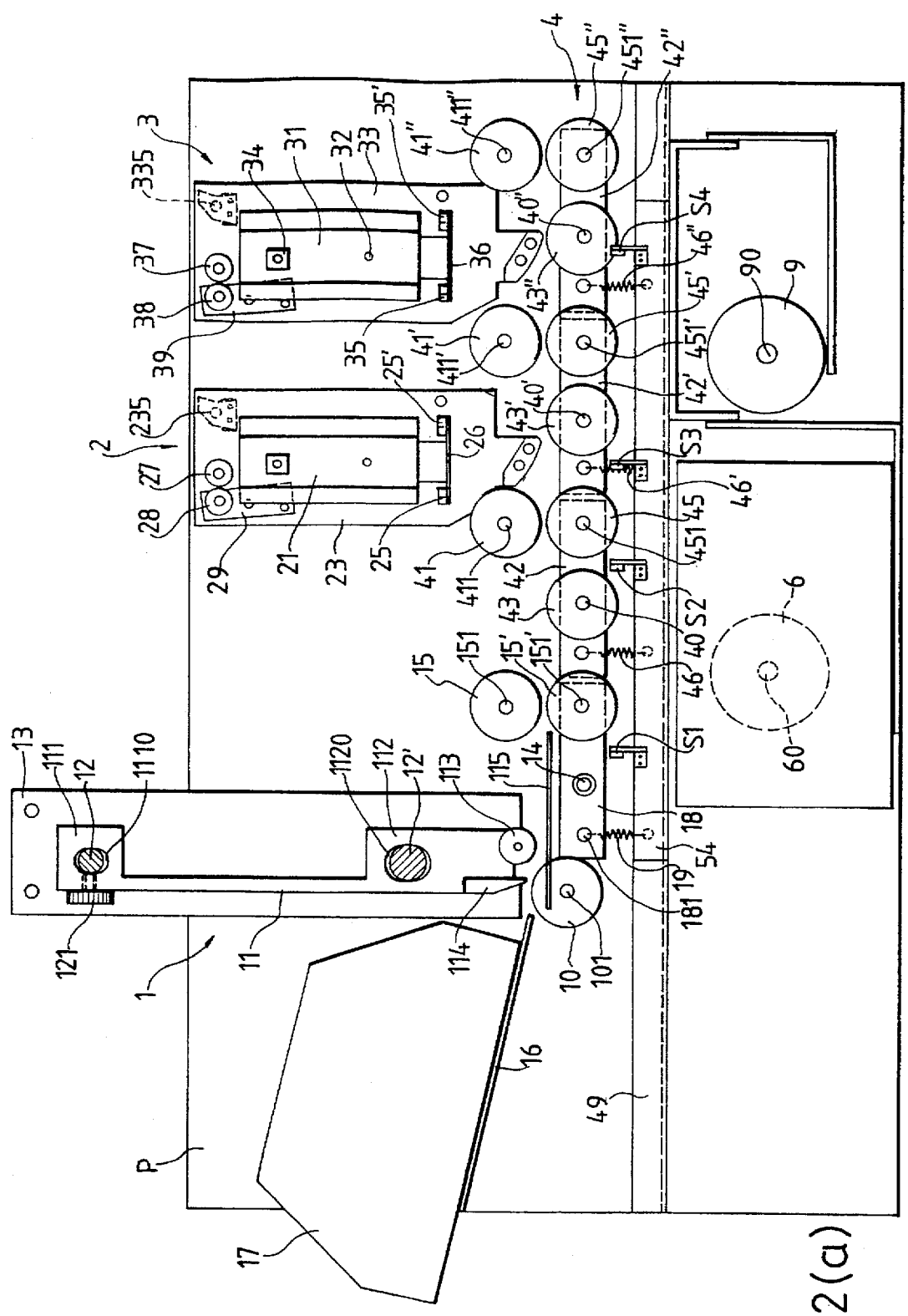
FIG. 2(a) is a cross-sectional view of a self mailing apparatus for forward tabbing and labeling according to the present invention.
Figure 4:
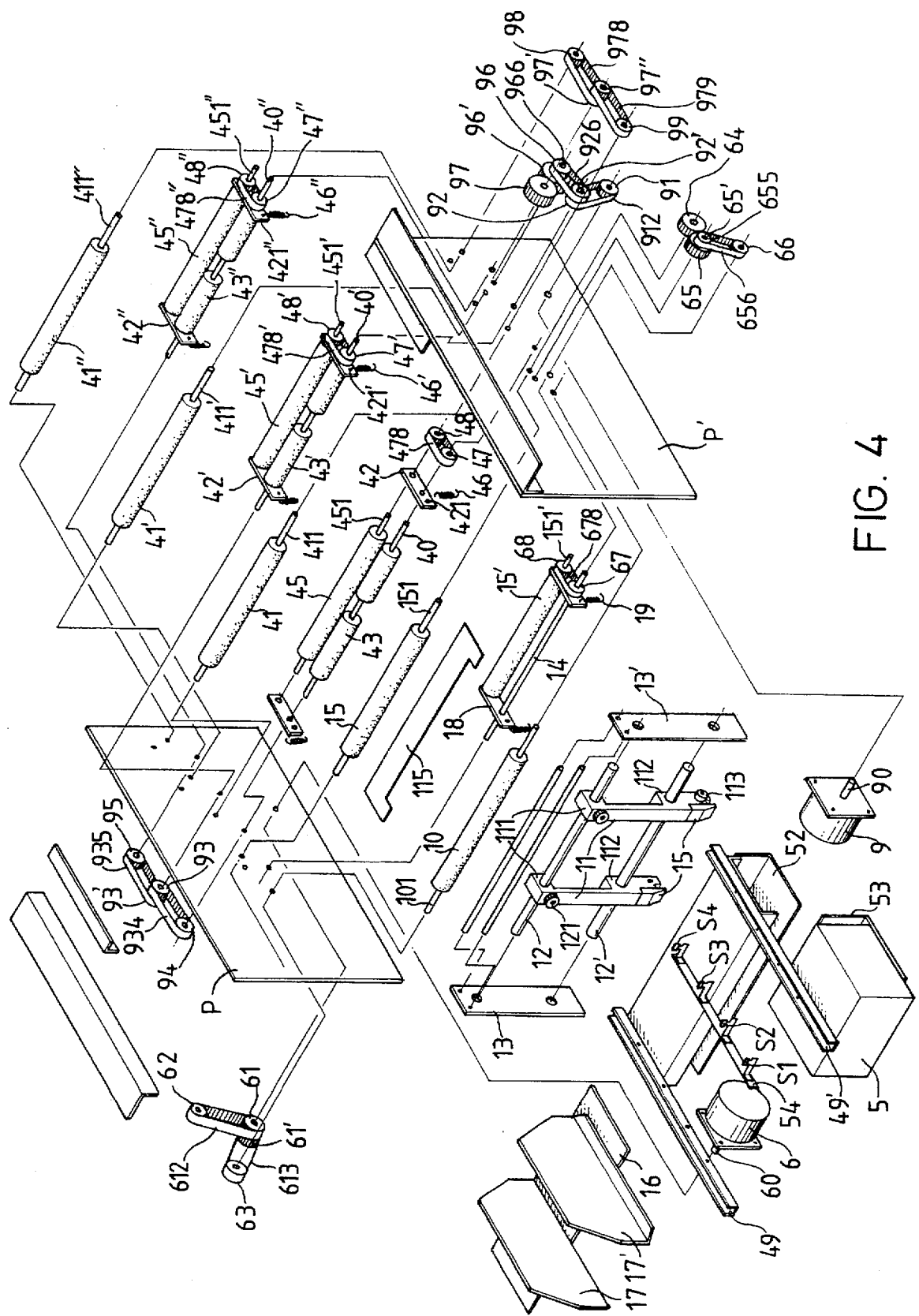
FIG. 4 is an exploded view of a feeder module and a media transport. mechanism according to the present invention.
Figure 6:
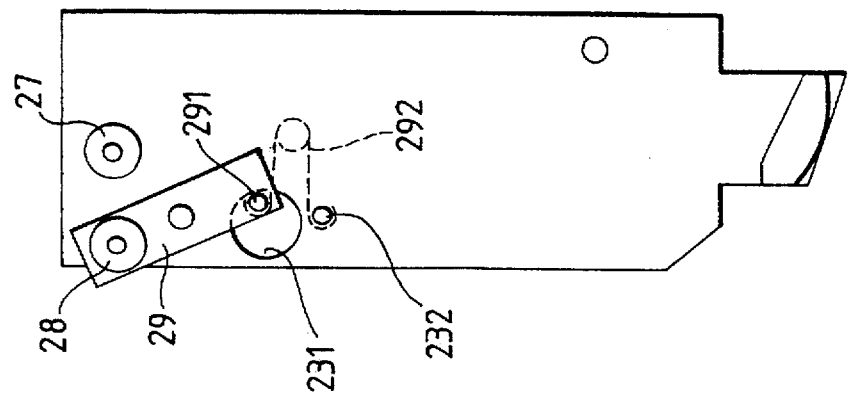
FIG. 6 is a cross-sectional view of a tabbing mechanism according to the present invention illustrating pinch rollers being separated from a tension roller.
Figure 5:
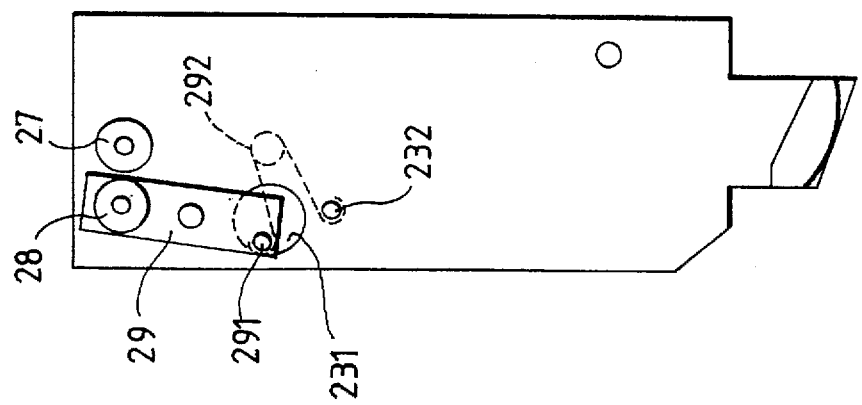
FIG. 5 is a cross-sectional view of a tabbing mechanism according to the present invention illustrating pinch rollers being in contact with a tension roller.

As shown particularly in FIGS. 1, 2(a), and 4, the feeder module 1 is to feed the media from the bottom of a pile of media. It should feed straight and only one piece at a time. A feed roller 10 is fixed on a feed roller shaft 101 rotatably disposed on the spaced main side plates P, P'. A pair of stop rods 11 are located above the feed roller 10. Each of the stop rods 11 is slidably disposed between a pair of guide bars 12, 12' which are fixed between a pair of feeder frames 13, 13'. The feeder frames 13, 13' are fixed to the inner surface of the main side plates P, P', respectively. The stop rod 11 has a first protruding portion 111 from the upper side and a second protruding portion 112 from the side below the middle of the stop rod 11. Each protruding portion 111 (112) has a slot 1110 (1120) to be passed through by the guide bar 12 (12'). The slot 1110 (1120) is larger than the guide shaft 12 (12') such that the stop rod 11 can be adjusted in a vertical direction, i.e., the gap between the stop rod 11 and the feed roller 10 is adjustable by an operator. The gap is usually slightly wider than the thickness of the media. An adjusting screw 121 passing through the stop rod 11 into the slot 1110 of the first protruding portion 111 is to fasten the stop rod 11 in both the vertical and horizontal positions with respect to the guide bars 12, 12'. A chamfered guiding block 114 is provided on the lower side of the stop rod 11 for facilitating the feeding of media. A pair of snubbers 113 each is eccentrically and adjustably mounted on one side of the second protruding portion 112 near its bottom. A base plate 16 is fixed between the main side plates P, P' with its front edge near the feed roller 10. The base plate 16 is inclined toward the feed roller 10. A pair of adjusting plates 17, 17' are movably disposed on the base plate 16 by magnetic force. For example, each of the adjusting plates 17, 17' can be provided with a magnetic stripe (not shown) on the bottom to adhere to the base plate 16 which is made of steel. The adjusting plates 17, 17', base plate 16, and stop rods 11, form a space for stacking media.

A registration roller module is disposed in front of the feed roller 10. The registration roller module comprises a lower registration roller assembly pivotably about a shaft 14 rotatably disposed on the main side plates P, P', and an upper registration roller 15 fixed on an upper registration roller shaft 151 rotatably disposed between the main side plates P, P'. A pair of subplates 18 are disposed on the shaft 14 between the main side plates P, P'. A lower registration roller 15' is fixed on a lower registration roller shaft 151' rotatably disposed on the subplates 18. The upper registration roller 15 is on the top of the lower registration roller 15'. The lower registration roller assembly is spring loaded by a pair of springs 19 disposed between the subplates 18 and the main side plates P, P'. For example, each of the springs 19 has one end hooked on a hole 181 of the subplate 18 and the other end hooked on a channel 49 (49') fixed on the inner side of the main side plate P (p'). A supporting plate 115 is fixed horizontally between the main side plates P, P' and located below the snubbers 113.

A first transmitting means connected to the upper registration roller shaft 151 is driven by a first driving means connected to a power supply 5 by a known way which will be omitted in description. The first driving means can be a first stepping motor 6 used to accomplish all feeding motions. The first stepping motor 6 is fixed to the inside of the main side plate P with its driving shaft 60 extended out of the main side plate P. The first transmitting means includes a driving gear 61 fixed on the driving shaft 60 of the first stepping motor 6, a driven gear 62 fixed on one end of the upper registration roller shaft 151 which is extended out of the main side plate P, a one-way clutch (not shown) positioned between the upper registration roller shaft 151 and the driven gear 62, and a timing belt 612 trained over the driving gear 61 and the driven gear 62. A second transmitting means connected to the feeder roller shaft 101 is also driven by the first driving means (the first stepping motor 6). The second transmitting means includes a driving gear 61'fixed on the driving shaft 60 of the first stepping motor 6 adjacent to the driving gear 61, a driven gear 63 fixed on one end of the feed roller shaft 101 which is extended out of the main side plate P, a one-way clutch (not shown) positioned between the driven gear 63 and the feed roller shaft 101, and a timing belt 613 trained over the driving gear 61' and the driven gear 63. A third transmitting means connects the upper registration roller shaft 151 to the shaft 14. The third transmitting means includes a driven gear 64 fixed on the other end of the upper registration roller shaft 151 which is extended out of the main side plate P', a pair of driven gears 65, 65' coaxially and rotatably disposed on a gear shaft 655 fixed to the main side plate P' and wherein the driven gear 65 is engaged with the driven gear 64, a driven gear 66 fixed on the shaft 14 of the lower registration roller assembly and the shaft 14 being extended out of the main side plate P', and a timing belt 656 trained over the driven gear 65' and the driven gear 66. A fourth transmitting means connects the shaft 14 and the lower registration roller shaft 151'. The fourth transmitting means includes a driving gear 67 fixed on the shaft 14, a driven gear 68 fixed on the lower registration roller shaft 151', and a timing belt 678 trained over the driving gear 67 and the driven gear 68.

As shown particularly in FIGS. 2(a), 3, 5, and 6, the tabbing mechanism 2 is disposed in front of the feeder module 1 and is pivotably about a first pivot axis 20 rotatably disposed on the main side plates P, P'. The tabbing mechanism 2 comprises at least one first tractor head 21 slidably disposed between a first lower tie shaft 22 fixed between a pair of spaced first frames 23 pivotably about the first pivot axis 20 and a first upper power shaft 24 rotatably disposed between the spaced first frames 23. A pair of first sensors 25, 25' are mounted on a first platform 26 and the first platform 26 is secured to the bottom of the first tractor head 21. A first tension roller 27 is fixed on a first tension roller shaft 271 rotatably disposed on the first frames 23. A pair of first pinch rollers 28 are rotatably and slidably disposed on a first pinch roller shaft 281 which is fixed between a pair of spaced first connecting plates 29 and near the top end thereof. The first connecting plates 29 are pivoted on the first frames 23. The outer side of each first connecting plate 29 has a first stub 291 located near the bottom. The first stub 291 is received in a first hole 231 formed in the first frame 23. A first torsion spring 292 is used to connect the first stub 291 to the first frame 23. One end of the first torsion spring 292 is hooked onto the first stub 291 and the other end may be hooked onto a first anchor piece 232 disposed on the first frame 23. The first pinch rollers 28 selectively make contact with the first tension roller 27 by rotating the combination of the first pinch rollers 28 and the first connecting plates 29 such that the first stubs 291 are movable within the first hole 231 of the first frame 23. The pinching force between the first pinch roller 28 and the first tension roller 27 is controlled by the resilience of the first torsion spring 292. A pair of first protrusions 234 each is provided on the outer surface of the first frame 23. A first detent 235 corresponding to the first protrusion 234 is provided on the inner side of the main side plate P (P') to catch the first protrusion 234 for positioning the first frame 23. A first separator bar 233 is fixed between the first frames 23 at the lowest positions thereof.

A fifth transmitting means connected to the first upper power shaft 24 of the tabbing mechanism 2 is driven by a second driving means connected to the power supply 5 by a known way which will be omitted in description. The second driving means can be a second stepping motor 7. The second stepping motor 7 is fixed to the outside of the main side plate P' with its driving shaft 70 extended into the main side plate P'. The fifth transmitting means includes a driving gear 71 connected to the driving shaft 70 of the second stepping motor 7, a pair of driven gears 72, 72' coaxially fixed on the first pivot axis 20, a driven gear 73 fixed on the first upper power shaft 24, a timing belt 712 trained over the driving gear 71 and the driven gear 72, and a timing belt 723 trained over the driven gear 72' and the driven gear 73. A sixth transmitting means connects the first upper power shaft 24 to the first tension roller shaft 271. The sixth transmitting means includes a driving gear 74 fixed on the first upper power shaft 24, a driven gear 75 fixed on the first tension roller shaft 271, and a timing belt 745 trained over the driving gear 74 and the driven gear 75.

The labeling mechanism 3 is disposed in front of the tabbing mechanism 2 and is pivotably about a second pivot axis 30 rotatably disposed between the main side plates P, P'. The labeling mechanism 3 comprises at least one second tractor head 31 slidably disposed between a second lower tie shaft 32 fixed between a pair of spaced second frames 33 pivotably about the second pivot axis 30 and a second upper power shaft 34 rotatably disposed between the spaced second frames 33. A pair of second sensors 35, 35' are mounted on a second platform 36 and the second platform 36 is secured to the bottom of the second tractor head 31. A second tension roller 37 is fixed on a second tension roller shaft 371 rotatably disposed on the second frames 33. A pair of second pinch rollers 38 are rotatably and slidably disposed on a second pinch roller shaft 381 which is fixed between a pair of spaced second connecting plates 39 and near the top end thereof. The second connecting plates 39 are pivoted on the second frames 33. The outer side of each second connecting plate 39 has a second stub 391 located near the bottom. The second stub 391 is received in a second hole 331 formed in the second frame 33. A second torsion spring 392 is used to connect the second stub 391 to the second frame 33. One end of the second torsion spring 392 is hooked onto the second stub 391 and the other end may be hooked onto a second anchor piece (not shown) disposed on the second frame 33. The second pinch rollers 38 selectively make contact with the second tension roller 37 by rotating the combination of the second pinch rollers 38 and the second connecting plates 39 such that the second stubs 391 are movable within the second hole 331 of the second frame 33. The pinching force between the second pinch roller 38 and the second tension roller 37 is controlled by the resilience of the second torsion spring 392. A pair of second protrusions 334 each is provided on the outer surface of the second frame 33. A second detent 335 corresponding to the second protrusion 334 is provided on the inner side of the main side plate P (P') to catch the second protrusion 334 for positioning the second frame 33. A second separator bar 333 is fixed between the second frames 33 at the lowest positions thereof.

A seventh transmitting means connected to the second upper power shaft 34 of the labeling mechanism 3 is driven by a third driving means connected to the power supply 5 by known way which will be omitted in description. The third driving means can be a third stepping motor 8. The third stepping motor 8 is fixed to the outside of the main side plate P with its driving shaft 80 extended into the main side plate P. The seventh transmitting means includes a driving gear 81 connected to the driving shaft 80 of the third stepping motor 8, a pair of driven gears 82, 82' coaxially fixed on the second pivot axis 30, a driven gear 83 fixed on the second upper power shaft 34, a timing belt 812 trained over the driving gear 81 and the driven gear 82, and a timing belt 823 trained over the driven gear 82' and the driven gear 83. An eighth transmitting means connects the second upper power shaft 34 and the second tension roller shaft 371. The eighth transmitting means includes a driving gear 84 fixed on the second upper power shaft 34, a driven gear 85 fixed on the second tension roller shaft 371, and a timing belt 845 trained over the driving gear 84 and the driven gear 85.

With reference to FIG. 4, the media transport mechanism 4 comprises three sets of roller modules. A first roller module is disposed in front of the lower registration roller assembly. The first roller module comprises a first lower roller assembly pivotably about a first pivot shaft 40 rotatably disposed on the main side plates P, P', and a first upper roller 41 fixed on a first upper roller shaft 411 rotatably disposed between the main side plates P, P'. A pair of first subplates 42 are disposed on the first pivot shaft 40 between the main side plates P, P'. A pair of first auxiliary rollers 43 are fixed on the first pivot shaft 40 between the first subplates 42. A first lower roller 45 is disposed in front of the first auxiliary rollers 43 and fixed on a first lower roller shaft 451 rotatably disposed on the first subplates 42. The first upper roller 41 is on the top of the first lower roller 45. The first lower roller assembly is spring loaded by a pair of first springs 46 disposed between the first subplates 42 and the main side plates P, P'. For example, each of the first springs 46 has one end hooked onto a first aperture 421 of the first subplate 42 and the other end hooked onto the channel 49 (49').

A second roller module is disposed in front of the first roller module. The second roller module comprises a second lower roller assembly pivotably about a second pivot shaft 40' rotatably disposed on the main side plates P, P', and a second upper roller 41' fixed on a second upper roller shaft 411' rotatably disposed between the main side plates P, P'. A pair of second subplates 42' are disposed on the second pivot shaft 40' between the main side plates P, P'. A pair of second auxiliary rollers 43' are fixed on the second pivot shaft 40' between the second subplates 42'. A second lower roller 45' is disposed in front of the second auxiliary rollers 43' and fixed on a second lower roller shaft 451' rotatably disposed on the second subplates 42'. The second upper roller 41' is on the top of the second lower roller 45'. The second lower roller assembly is spring loaded by a pair of second springs 46' disposed between the second subplates 42' and the main side plates P, P'. For example, each of the second springs 46' has one end hooked onto a second aperture 421' of the second subplate 42' and the other end hooked onto the channel 49 (49').

A third roller module is disposed in front of the second roller module. The third roller module comprises a third lower roller assembly pivotably about a third pivot shaft 40" rotatably disposed on the main side plates P, P', and a third upper roller 41" fixed on a third upper roller shaft 411" rotatably disposed between the main side plates P, P'. A pair of third subplates 42" are disposed on the third pivot shaft 40" between the main side plates P, P'. A pair of third auxiliary rollers 43" are fixed on the third pivot shaft 40" between the third subplates 42". A third lower roller 45" is disposed in front of the third auxiliary rollers 43" and fixed on a third lower roller shaft 451" rotatably disposed on the third subplates 42". The third upper roller 41" is on the top of the third lower roller 45". The third lower roller assembly is spring loaded by a pair of third springs 46" disposed between the third subplates 42"and the main side plates P, P'. For example, each of the third springs 46" has one end hooked onto a third aperture 421" of the third subplate 42" and the other end hooked onto the channel 49 (49').

A PC board box 52 is fixed on the bottom of the channels 49, 49'. A bracket 53 for mounting the power supply 5 is fixed adjacent to the PC board box 52. Four sensors S1, S2, S3 and S4 are distributively provided on a strut 54 fixed on the PC board box 52.

A ninth transmitting means connected to the second pivot shaft 40' of the second lower roller assembly is driven by a fourth driving means connected to the power supply 5 by a known way which will be omitted in description. The fourth driving means can be a fourth stepping motor 9. The fourth stepping motor 9 is fixed to the inside of the main side plate P' with its driving shaft 90 extended out of the main side plate P'. The ninth transmitting means includes a driving gear 91 connected to the driving shaft 90 of the fourth stepping motor 9, a driven gear 92 fixed on the second pivot shaft 40', and a timing belt 912 trained over the driving gear 91 and the driven gear 92. A tenth transmitting means connects the second pivot shaft 40'and the second lower roller shaft 451'. The tenth transmitting means includes a driving gear 47' fixed on the second pivot shaft 40', a driven gear 48' fixed on the second lower roller shaft 451', and a timing belt 478' trained over the driving gear 47' and the driven gear 48'.

An eleventh transmitting means connects the second pivot shaft 40' and the first pivot shaft 40. The eleventh transmitting means includes a driving gear 93 fixed on the second pivot shaft 40', a driven gear 94 fixed on the first pivot shaft 40, and a timing belt 934 trained over the driving gear 93 and the driven gear 94. A twelfth transmitting means connects the first pivot shaft 40 and the first lower roller shaft 451. The twelfth transmitting means includes a driving gear 47 fixed on the first pivot shaft 40, a driven gear 48 fixed on the first lower roller shaft 451, and a timing belt 478 trained over the driving gear 47 and the driven gear 48.

A thirteenth transmitting means connects the second pivot shaft 40' and the third pivot shaft 40". The thirteenth transmitting means includes a driving gear 93' fixed on the second pivot shaft 40' adjacent to the driving gear 93, a driven gear 95 fixed on the third pivot shaft 40", and a timing belt 935 trained over the driving gear 93' and the driven gear 95. A fourteenth transmitting means connects the third pivot shaft 40" and the third lower roller shaft 451". The fourteenth transmitting means includes a driving gear 47" fixed on the third pivot shaft 40", a driven gear 48" fixed on the third lower roller shaft 451", and a timing belt 478" trained over the driving gear 47" and the driven gear 48".

A fifteenth transmitting means connects the ninth transmitting means and the second upper roller shaft 411'. The fifteenth transmitting means includes a driven gear 92' fixed on the second pivot shaft 40' adjacent to the driven gear 92, a pair of driven gears 96, 96' coaxially and rotatably disposed on a gear shaft 966 fixed to the main side plate P', a driven gear 97 fixed on the second upper roller shaft 411' and engaged with the driven gear 96', and a timing belt 926 trained over the driven gear 92' and the driven gear 96.

A sixteenth transmitting means connects the second upper roller shaft 411' and the third upper roller shaft 411". The sixteenth transmitting means includes a driven gear 97' fixed on the second upper roller shaft 411' adjacent to the driven gear 97, a driven gear 98 fixed on the third upper roller shaft 411", and a timing belt 978 trained over the driven gear 97' and the driven gear 98.

A seventeenth transmitting means connects the second upper roller shaft 411' and the first upper roller shaft 411. The fourteenth transmitting means includes a driven gear 97" fixed on the second upper roller shaft 411' adjacent to the driven gear 97', a driven gear 99 fixed on the first upper roller shaft 411, and a timing belt 979 trained over the driven gear 97" and the driven gear 99.

The detailed gear trains from the four stepping motors 6, 7, 8, and 9 are shown in FIG. 7.

In the operation of the invention, commands to motion or signals from detecting means are all processed through a microprocessor (not shown) embedded in the self mailing apparatus. The microprocessor controls all the media handling and jam detection functions. As the feeding begins, the feed roller 10 turns and pulls the bottom piece of media through the gap between the chamfered guiding block 114 and the feed roller 10. Three kinds of frictional forces are exerted on the media, i.e., the weight of the pile, the chamfered guiding block 114 of the stop rod 11, and the drag from the base plate 16. The snubbers 113 are used to prevent double feed and help avoid misfeed. If no snubber, it is always to adjust the gap between the stop rod (gate) and the feed roller to be slightly wider than the thickness of the media. However, depending on the surface condition (either rough or smooth) of the media, rough surface tends to stick together, some smoother surfaces slide with each other easier; hence, controlling thickness may not accomplish the intended purposes. Rough surface needs narrower gap than a smooth one so as to avoid double feed. As the gap decreases, the normal force exerted on the leading edge of media by the gate is increased, and the gate and feeder roller form a wedge and compress the leading edge of the media. Usually, the media is made of paper, if it is compressed too much, the air contained therein is squeezed out and thickness reduces. The wedge effect jams the entire gate and misfeed occurs. In most cases, double feed occurs when media is rough, or humidity of air is high if the gap is too wide. To avoid misfeed, gap needs "wider"passage. But, if the gap is too wide, it will invite double feed. In the invention, the snubber 113 is a single piece of object curved in such a way that deforms the exit media out of a straight path. The media bends slightly away from the straight path when in contact with the snubber 113. If it were a single feed, there is no problem for the feed roller 10 to provide the energy needed to push through the snubber 113. However, if double feed occurs, only the bottom piece passes through and the upper piece is stopped by the snubber 113, this is because the friction force between the media (bottom piece and the one above it) is not sufficient to drive the piece above it to pass the snubber 113. As a result, double feed is eliminated by the snubber 113; the one stuck by the snubber 113 will be fed through the next time; and miss feed is virtually eliminated by increasing the gap width to, say, slightly less than two pieces of the media. Moreover, stiffer media needs more snubbing (means to deform the media more), that is why the snubber 113 is mounted eccentrically and adjustably.

The registration rollers 15, 15' can prevent the feeding media from skewing. The stepping motor 6 is bidirectionally controlled. As the stepping motor 6 drives the driving gear 61' to rotate clockwise (in view of FIG. 7), the driven gear 63 rotates clockwise by the timing belt 613 and the one-way clutch between the driven gear 63 and the feed roller shaft 101 engages, the feed roller shaft 101 then rotates clockwise, on the other hand, the driving gear 61 drives the driven gear 62 to rotate clockwise by the timing belt 612, the one-way clutch between the upper registration roller shaft 151 and the driven gear 62 disengages such that the upper registration roller shaft 151 is still. The lower registration roller shaft 151' is also still because it is driven by the upper registration roller shaft 151 through the third and fourth transmitting means.

As the stepping motor 6 drives the driving gear 61' to rotate counterclockwise, the driven gear 63 rotates counterclockwise by the timing belt 613 and the one-way clutch between the driven gear 63 and the feed roller shaft 101 disengages, the feed roller shaft 101 is still, on the other hand, the driving gear 61 causes the driven gear 62 to rotate counterclockwise by the timing belt 612, the one-way clutch between the upper registration roller shaft 151 and the driven gear 62 engages such that the upper registration roller shaft 151 rotates counterclockwise, the shaft 14 rotates clockwise by the third transmitting means, and the lower registration shaft 151' rotates clockwise by the fourth transmitting means.

If the media is fed against a stationery straight line with a slight overfeed, it will create a buckle (a paper spring) in the media. If the straight line is the tangent line of a set of rollers, the rollers are defined as registration rollers. As mentioned above, if the feed roller shaft 101 rotates clockwise, the registration roller shafts 151, 151' are still. It will register the leading edge against the tangent of the registration rollers 15, 15'. When the sensor S1 detects the leading edge of the media, the microprocessor continues to rotate the feed roller 10 clockwise for a predetermined rotation equivalent to the distance between the sensor S1 and the upper (lower) registration roller 15 (15'). As the event of registration is accomplished, the first stepping motor 6 rotates reversely (counterclockwise), the feed roller 10 stops, the upper and lower registration rollers 15, 15' start to turn and moves the media to the media transport mechanism 4. Once the upper and the lower registration rollers 15, 15' take over, the remaining portion of the moving piece and the feed roller 10 become driven members with very little drag to the upper and lower registration rollers 15, 15'. When the sensor S2 detects the leading edge of the media, the microprocessor continues to rotate the first stepping motor 6 counterclockwise for a predetermined rotation, i.e. a predetermined number of steps, equivalent to the distance between the sensor S2 and the first upper (lower) roller 41 (45) to insure that the leading edge of the media goes into the first upper (lower) roller 41 (45). The first stepping motor 6 continues rotating counterclockwise until the sensor 1 detects the trailing edge of the media. When the trailing edge of the media is detected by the sensor S1, the first stepping motor 6 rotates reversely (clockwise) again as the above, the feed roller 10 feeds another media and the upper and lower registration rollers 15, 15' are stopped to create another buckle. When the feeding cycle is started for the first time, the fourth stepping motor 9 (transport motor) is also started and it runs continuously until the microprocessor detects an error, runs out of media or is commanded to stop by the operator. The sensor S3 detects the leading edge of the media in the media transport mechanism 4. A number of steps, N tabs, are counted after the sensor S3 detects the leading edge of the media and then the second stepping motor 7 (tab motor) is activated to apply one or two tabs to the leading edge of the media. The sensor S4 detects the leading edge of the media. A number of steps, N labels, are counted after the sensor S4 detects the leading edge of the media and an address label is applied to the media.

It is noted that both the upper registration roller 15 and the lower registration roller 15' of the registration roller module are powered and move at the same linear speed. If the media is of multi-layer, then possible relative sliding motion between layers is eliminated. (Traditional mechanism only drives one roller.) Since the subplates 18 are not rigidly tied together and are independently spring loaded, the registration roller module has a small "degree of freedom" to be twisted. If the media, for one reason or another, has a different thickness at its leading edge, a rigid subplate could only make partial grabbing of the leading edge. Skew or jam may result from this. However, floating the lower registration roller 15'will eliminate this possibility. The substantially same function and structure also exist in the three sets of roller modules, which will be omitted in description for simplification, except that the auxiliary rollers 43 (43', 43") act as a media guide, they replace the traditional support plate of which any cut out tends to catch media corners.

Figure 10:
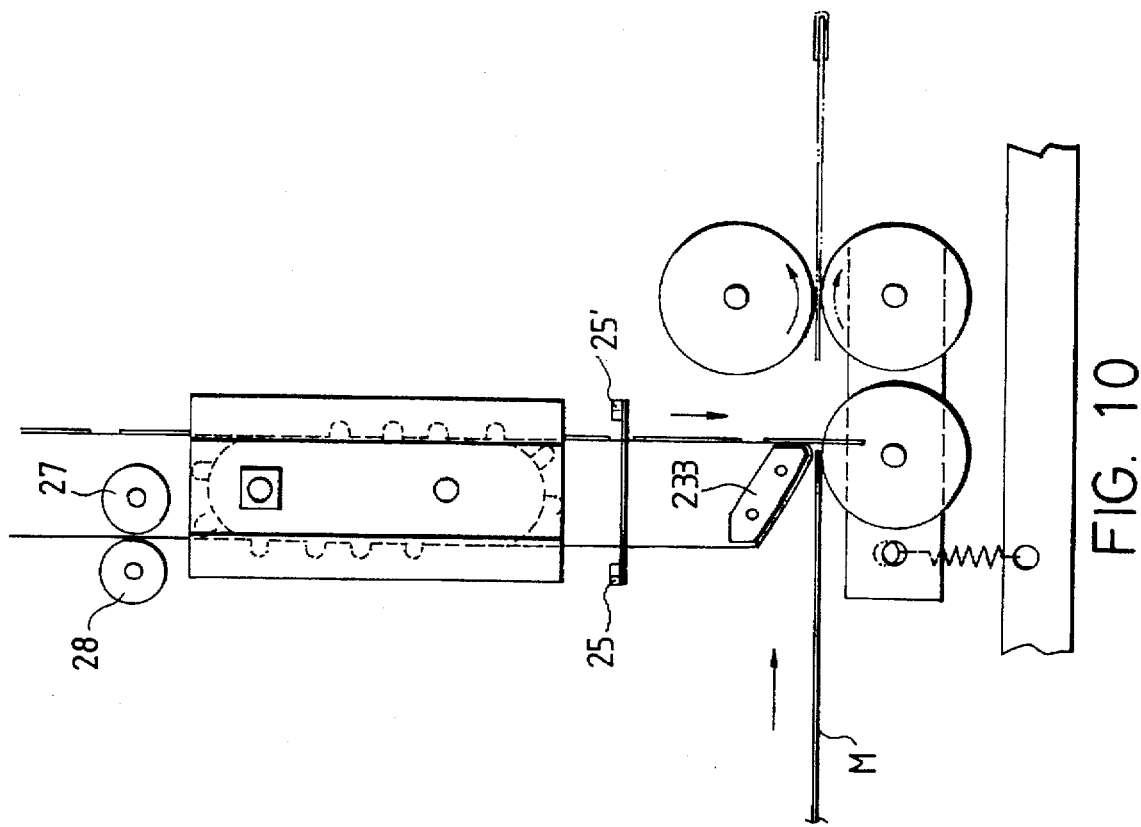
FIG. 10 is a schematic, cross-sectional view of a tabbing mechanism according to the present invention.

With reference to FIGS. 8 through 10, a tab carrier 210 for carrying tabs 211 is fed by pin feeding. The tab carrier 210 has a plurality of holes 216 along its center line, distance between the holes 216 is equal to the pitch of the tractor head pin 217. A slot or an optically distinguishable ink mark 218 between the carrier 210 and the tab 211 is deposited on the tab carrier 210. The first sensors 25, 25' detect the tab carrier 210 before and after a tab 211 is applied on the moving media M. The ink mark 218 is detectable by the first sensor 25, 25' after the tab 211 is separated. Default condition will enable the microprocessor to stop the tabbing mechanism 2 instantaneously. The lead of the tab carrier 210 can be manually guided by the tractor head pin 217 from one side (push side) of the first tractor head 21. The tab carrier 210 wraps around the first separator bar 233 when the button on a control panel (not shown) is pressed. The tab carrier 210 is then guided by the tractor head pin 217 from the other side (pull side) of the first tractor head 21 and pinched by the first tension roller 27 and the first pinch roller 28. The first tractor head 21 and the first tension roller 27 are both powered by the same motor (the second stepping motor 7). This arrangement assures that proper carrier tension is always maintained even at dynamic oscillation of start/stop of the stepping motor. The tab 211 is pre-fed half way and intercepts the leading edge of the media M. As the contact of the two is made, both the media M and the tab 211 move together to the second upper roller 41' and the second lower roller 45' for wrapping around.

The special tab/carrier and the hybrid characteristics of its feeding mechanism requires that both components have to function together. The tab/carrier would be useless if it were driven either by a pure tractor pin drive system or a pure friction feed roller system. The same technique can be used on labels. Different length of the tab or label can be detected by the interval of the optical ink mark.

If the tab is too wide for a single tractor head to drive, a pair of tractor heads are required. As shown in FIG. 12, a carrier 216' for tabs 211' is similar to that for labels, i.e., two rows of holes 216' are at both sides of the carrier 210'. A slot or an optically distinguishable ink mark 218' can be covered by the tab or label material. Normal state of the tab (label) carrier 210' including: (a) input to the tractor head should not detect the ink mark; and (b) output from the tractor head should detect the ink mark. The tab or label is opaque (not transparent), and the carrier material is also opaque. The ink mark, (say, using black ink) is sandwiched in between two opaque material.

Figure 11:
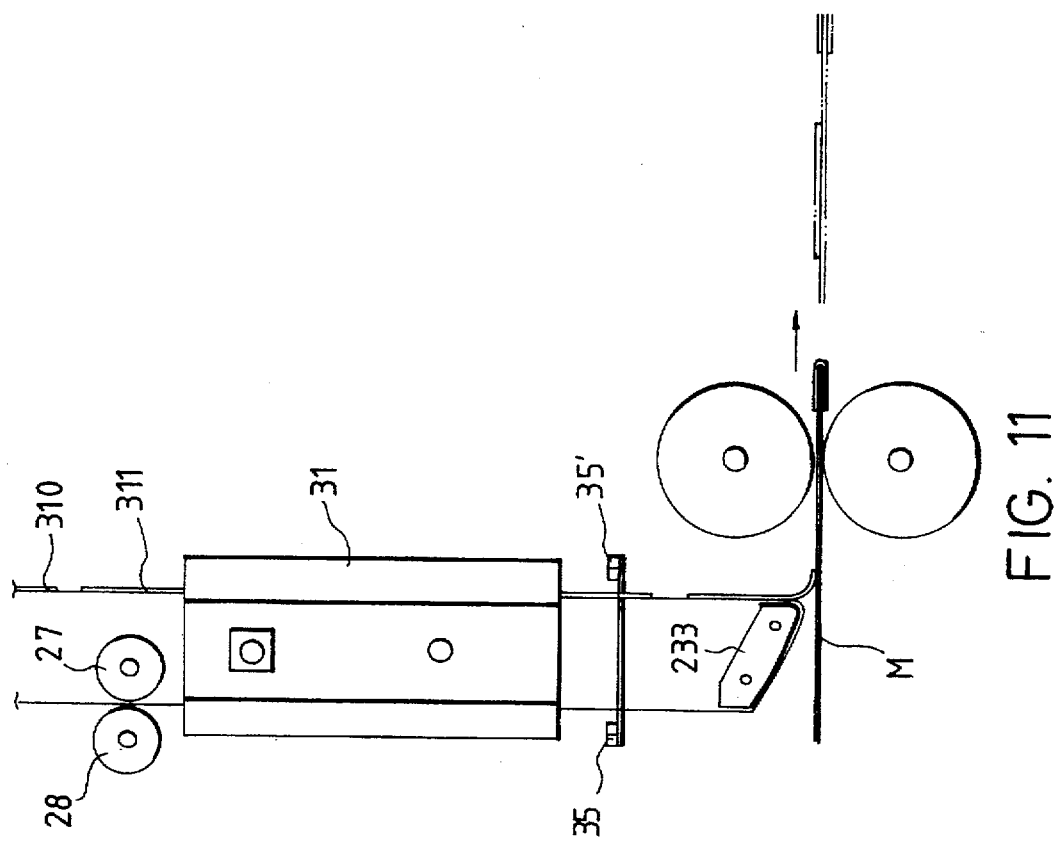
FIG. 11 is a schematic, cross-sectional view of a labeling mechanism according to the present invention.

With reference to FIG. 11, a label carrier 310 is fed into the second tractor head 31 of the labeling mechanism 3, after the second separator bar 333, and re-enter the second tractor head 31. The second sensors 35, 35' detect the label carrier 310 before and after a label 311 is applied on the moving media M, and such a feeding is completed.

It is noted that the tabbing mechanism can be disposed reversely or a further tabbing mechanism can be added to facilitate different direction of transport by using the same technical features as disclosed in the above. The "Z" folding tabbing can be accomplished by the combination of forward and reverse tabbing.

Figure 2B:
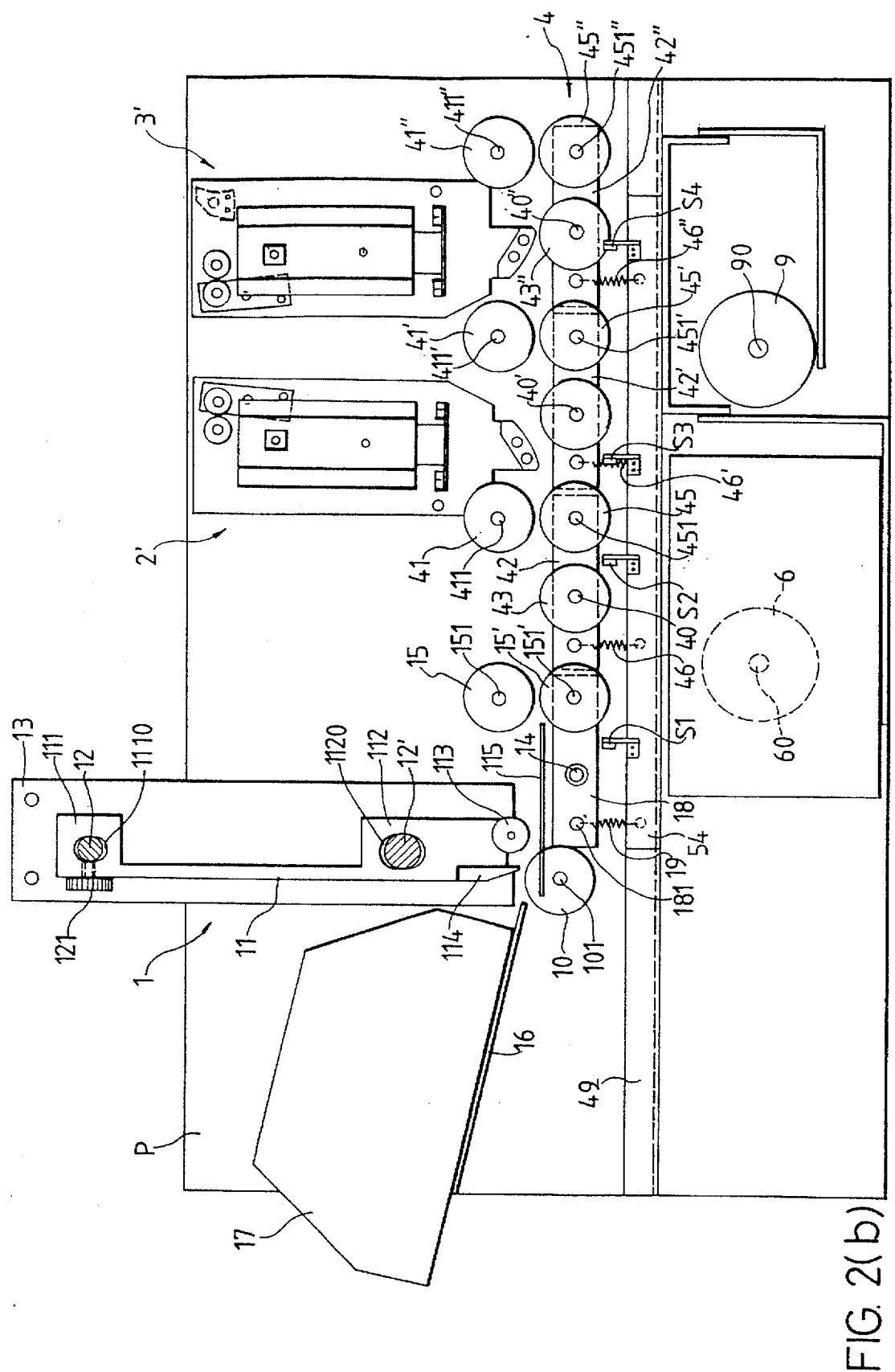
FIG. 2(b) is a cross-sectional view of a self mailing apparatus for reverse tabbing according to the present invention.
Figure 3:
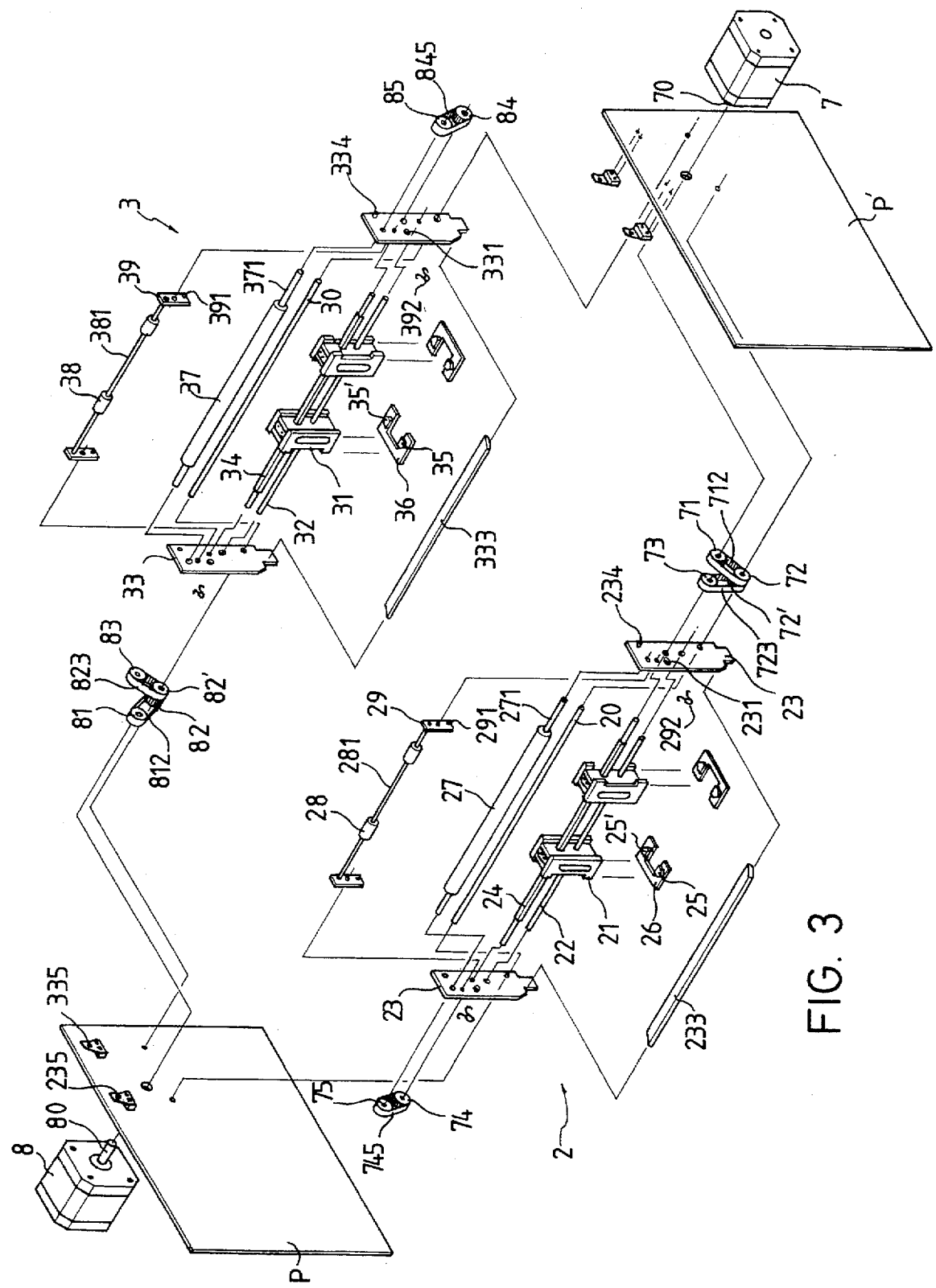
FIG. 3 is an exploded view of a tabbing and a labeling mechanisms according to the present invention.
Figure 13:
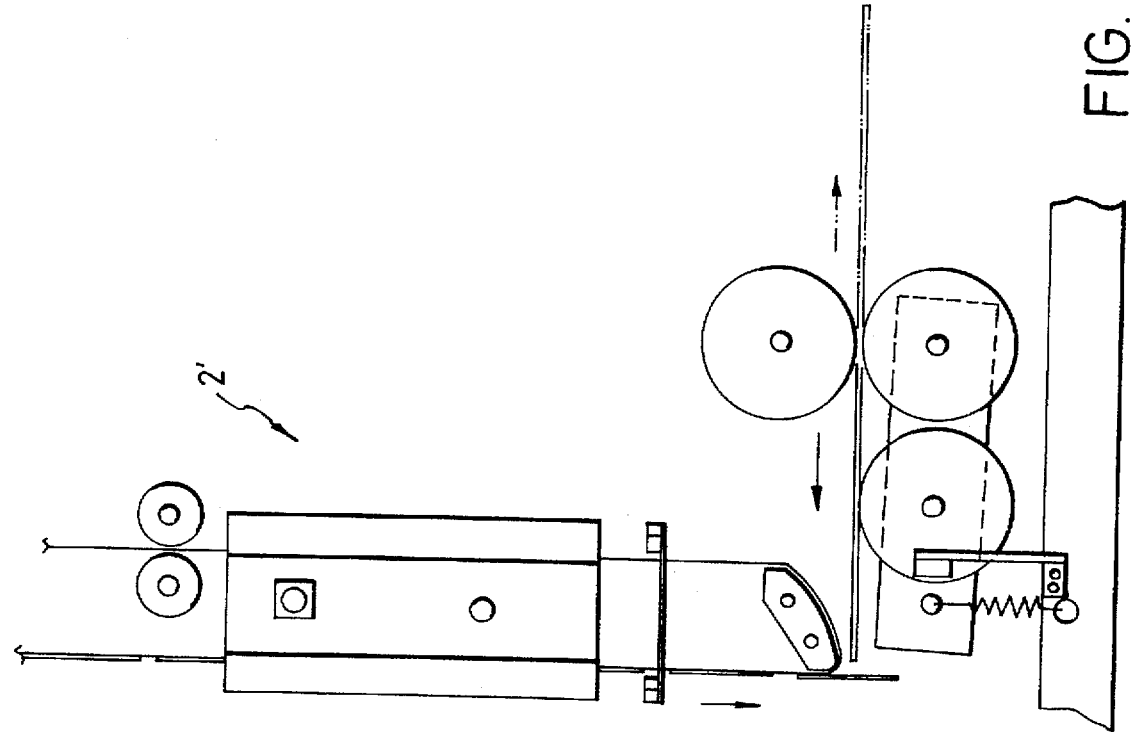
FIG. 13 is a schematic, cross-sectional view of a reverse tabbing mechanism according to the present invention.

As shown in FIG. 2(b), a reverse tabbing mechanism 2' is used to replace the tabbing mechanism 2 indicated in FIGS. 2(a) and 13. Since the reverse tabbing mechanism 2' has the same structure as the tabbing mechanism 2, the redundant description about the structure is thus omitted. In operation, when the driving shaft 60 of the first stepping motor 6 rotates clockwise, the feed roller shaft 101 rotates clockwise (the upper and lower registration rollers 15, 15' do not rotate) to feed the media up to the upper and lower registration rollers 15, 15'. When the sensor S1 detects the leading edge of the media, the microprocessor continues to rotate the feed roller 10 clockwise for a predetermined rotation equivalent to the distance between the sensor S1 and the upper (lower) registration roller 15 (15'). As the event of registration is accomplished, the first stepping motor 6 rotates reversely (counterclockwise), the feed roller 10 stops, the upper and lower registration rollers 15, 15' start to turn and moves the media to the media transport mechanism 4. When the sensor S2 detects the leading edge of the media, the microprocessor continues to rotate the first stepping motor 6 counterclockwise for a predetermined rotation, i.e. a predetermined number of steps, equivalent to the distance between the sensor S2 and the first upper (lower) roller 41 (45) to insure that the leading edge of the media goes into the first upper (lower) roller 41 (45). The first stepping motor 6 continues rotating counterclockwise until the sensor 1 detects the trailing edge of the media. When the trailing edge of the media is detected by the sensor S1, the first stepping motor 6 rotates reversely (clockwise) again as the above, the feed roller 10 feeds another media. The sensor S3 detects the leading edge of the media in the media transport mechanism 4. The sensor S3 also detects that the trailing edge of the media is past the tabbing position. The first stepping motor 6 stops with the leading edge of the media at sensor S2 until the transport path is clear to receive the next piece of media. After the media transport mechanism 4 is ready to receive media, the original media at sensor S2 is fed up to the first upper (lower) roller 41 (45).

When the feeding cycle is started up for the first time, the fourth stepping motor 9 (transport motor) is also started and it runs continuously. Rotation of the fourth stepping motor 9 is reversed to move the media transport mechanism 4 in the reverse direction after the sensor S3 detects the trailing edge of the media. The sensor S3 determines the correct tabbing position and one or two tabs are applied to the trailing edge of the media. After the trailing edge of the media is tabbed, rotation of the stepping motor 9 is reversed again to move the media transport mechanism 4 in the forward direction. The sensor S4 detects that the leading edge of the media is approaching the forward alternate sealing/labeling mechanism 3'. The sensor S4 determines the correct position to apply a blank label in such a manner that the leading edge of the media is sealed. A number of steps are counted and a second label (printed address label) is applied to the media to complete the feeding. The second label can be omitted if the media is pre-addressed.

While the structure and features of the present invention have become more apparent from the above detailed description and illustration, it is to be understood that the embodiment has been described only by way of illustrating the preferred operation of the present invention without limiting the scope of the present invention. Therefore, it is intended that any modifications and changes that can be made to the embodiment without departing from the spirit of the present invention are within the scope as set forth in the appended claims.

| Reference Numerals List: | |
|---|---|
| M | media |
| P, P' | main side plate |
| S1, S2, S3, S4 | sensor |
| 1 | feeder module |
| 2 | tabbing mechanism |
| 2' | reverse tabbing mechanism |
| 3 | labeling mechanism |
| 3' | sealing/labeling mechanism |
| 4 | media transport mechanism |
| 5 | power supply |
| 6 | first stepping motor |
| 7 | second stepping motor |
| 8 | third stepping motor |
| 9 | fourth stepping motor |
| 10 | feed roller |
| 11 | stop rod |
| 12, 12' | guide bar |
| 13, 13' | feeder frame |
| 14 | shaft |
| 15 | upper registration roller |
| 15' | lower registration roller |
| 16 | base plate |
| 17, 17' | adjusting plate |
| 18 | subplate |
| 19 | spring |
| 20 | first pivot axis |
| 21 | first tractor head |
| 22 | first lower tie shaft |
| 23 | first frame |
| 24 | first upper power shaft |
| 25, 25' | first sensor |
| 26 | first platform |
| 27 | first tension roller |
| 28 | first pinch roller |
| 29 | connecting plate |
| 30 | second pivot axis |
| 31 | second tractor head |
| 32 | second lower tie shaft |
| 33 | second frame |
| 34 | second upper power shaft |
| 35, 35' | second sensor |
| 36 | second platform |
| 37 | second tension roller |
| 38 | second pinch roller |
| 39 | second connecting plate |
| 40 | first pivot shaft |
| 40' | second pivot shaft |
| 40" | third pivot shaft |
| 41 | first upper roller |
| 41' | second upper roller |
| 41" | third upper roller |
| 42 | first subplate |
| 42' | second subplate |
| 42" | third subplate |
| 43 | first auxiliary roller |
| 43' | second auxiliary roller |
| 43" | third auxiliary roller |
| 45 | first lower roller |
| 45' | second lower roller |
| 45" | third lower roller |
| 46 | first spring |
| 46' | second spring |
| 46" | third spring |
| 47, 47', 47" | driving gear |
| 48, 48', 48" | driven gear |
| 49, 49' | channel |
| 52 | PC board box |
| 53 | bracket |

-continued

| Reference Numerals List: | |
|---|---|
| 54 | strut |
| 60, 70, 80, 90 | driving shaft |
| 61, 61' | driving gear |
| 62 to 65, 65', 66 | driven gear |
| 67 | driving gear |
| 68 | driven gear |
| 71 | driving gear |
| 72, 72', 73 | driven gear |
| 74 | driving gear |
| 75 | driven gear |
| 81 | driving gear |
| 82, 82', 83 | driven gear |
| 84 | driving gear |
| 85 | driven gear |
| 91 | driving gear |
| 92, 92' | driven gear |
| 93, 93' | driving gear |
| 94, 95 | driven gear |
| 96, 96' | driven gear |
| 97, 97', 97" | driven gear |
| 98, 99 | driven gear |
| 101 | feed roller shaft |
| 111 | first protruding portion |
| 112 | second protruding portion |
| 113 | snubber |
| 114 | guiding block |
| 115 | supporting plate |
| 121 | adjusting screw |
| 151 | upper registration roller shaft |
| 151' | lower registration roller shaft |
| 181 | hole |
| 210 | tab carrier |
| 211 | tab |
| 216 | hole |
| 217 | tractor head pin |
| 218 | ink mark |
| 231 | first hole |
| 232 | first anchor piece |
| 233 | first separator bar |
| 234 | first protrusion |
| 235 | first detent |
| 271 | first tension roller shaft |
| 281 | first pinch roller shaft |
| 291 | first stub |
| 292 | first torsion spring |
| 310 | label carrier |
| 311 | label |
| 331 | second hole |
| 333 | second separator bar |
| 334 | second protrusion |
| 335 | second detent |
| 371 | second tension roller shaft |
| 381 | second pinch roller shaft |
| 391 | second stub |
| 392 | second torsion spring |
| 411 | first upper roller shaft |
| 411' | second upper roller shaft |
| 411" | third upper roller shaft |
| 421 | first aperture |
| 421' | second aperture |
| 421" | third aperture |
| 451 | first lower roller shaft |
| 451' | second lower roller shaft |
| 451" | third lower roller shaft |
| 478, 478', 478" | timing belt |
| 612, 613 | timing belt |
| 655 | gear shaft |
| 656, 678 | timing belt |
| 712, 723, 745 | timing belt |
| 812, 823, 845 | timing belt |
| 912, 926, 934, 935 | timing belt |
| 966 | gear shaft |
| 978, 979 | timing belt |
| 1110, 1120 | slot |

What is claimed is:

1. A self mailing apparatus comprising:
a pair of spaced main side plates;
a feeder module for feeding a stack of media being mounted between the main side plates;
a registration roller module disposed in front of the feeder module;
a tabbing mechanism disposed in front of the feeder module and being pivotable about a first pivot axis rotatably disposed on the main side plates;
a labeling mechanism disposed in front of the tabbing mechanism and being pivotable about a second pivot axis rotatably disposed between the main side plates;
a media transport mechanism comprising a first, a second, and a third roller modules disposed in front of the feeder module and being in alignment;
a first driving means for driving the feeder module and the registration roller module;
a second driving means for driving the tabbing mechanism;
a third driving means for driving the labeling mechanism; and
a fourth driving means for driving the media transport mechanism.

2. The self mailing apparatus as claimed in claim 1, wherein the feeder module comprises a feed roller rotatably disposed between the spaced main side plates, a pair of stop rods located above the feed roller and slidably disposed between a pair of guide bars fixed between a pair of feeder frames fixed to the inner surface of the main side plates to form a gap with the feed roller; a base plate fixed between the main side plates with its front edge near the feed roller and inclined toward the feed roller; and a pair of adjusting plates movably disposed on the base plate; whereby the adjusting plates, base plate, and stop rods, form a space for stacking media.

3. The self mailing apparatus as claimed in claim 1, wherein the registration roller module comprises a lower registration roller assembly pivotable about a shaft rotatably disposed on the main side plates, and an upper registration roller fixed on an upper registration roller shaft rotatably disposed between the main side plates.

4. The self mailing apparatus as claimed in claim 3, wherein the lower registration roller assembly comprises a lower registration roller fixed on a lower registration roller shaft rotatably disposed on a pair of subplates which are disposed on the shaft between the main side plates, wherein the upper registration roller is on the top of the lower registration roller.

5. The self mailing apparatus as claimed in claim 4, wherein the lower registration roller assembly is spring loaded by a pair of springs disposed between the subplates and the main side plates.

6. The self mailing apparatus as claimed in claim 1, wherein each of the stop rods is provided with a snubber eccentrically and adjustably mounted on one side of the stop rod and near its bottom and on an exit of the feeder module to do snubbing to eliminate double feeding and skew feeding when a media is fed by the feeder module.

7. The self mailing apparatus as claimed in claim 1, wherein the tabbing mechanism comprises at least one first tractor head slidably disposed between a first lower tie shaft fixed between a pair of spaced first frames pivotable about the first pivot axis and a first upper power shaft rotatably disposed between the spaced first frames.

8. The self mailing apparatus as claimed in claim 7, wherein the tabbing mechanism further comprises a first tension roller fixed on a first tension roller shaft rotatably disposed on the first frames; and a pair of first pinch rollers rotatably and slidably disposed on a first pinch roller shaft fixed between a pair of spaced first connecting plates and near the top end thereof, the first connecting plates being pivoted on the first frames, and the first pinch rollers selectively making contact with the first tension roller to provide a pull force to keep the tension of a tab carrier transported by the first tractor head evenly to avoid slippage of the tab carrier which is driven by the first tractor head.

9. The self mailing apparatus as claimed in claim 7, Wherein the first tractor head is provided with a pair of sensors at the bottom.

10. The self mailing apparatus as claimed in claim 1, wherein the labeling mechanism comprises a pair of second tractor heads slidably disposed between a second lower tie shaft fixed between a pair of spaced second frames pivotable about the second pivot axis and a second upper power shaft rotatably disposed between the spaced second frames.

11. The self mailing apparatus as claimed in claim 10, wherein the labeling mechanism further comprises a second tension roller fixed on a second tension roller shaft rotatably disposed on the second frames; and a pair of second pinch rollers rotatably and slidably disposed on a second pinch roller shaft fixed between a pair of spaced second connecting plates and near the top end thereof, the second connecting plates being pivoted on the second frames, and the second pinch rollers selectively making contact with the second tension roller to provide an pull force to keep the tension of a label carrier transported by the second tractor head evenly to avoid slippage of the label carrier which is driven by the second tractor head.

12. The self mailing apparatus as claimed in claim 10, wherein each of the second tractor heads is provided with a pair of sensors at the bottom.

13. The self mailing apparatus as claimed in claim 1, wherein each of the roller modules comprises a lower roller assembly pivotable about a pivot shaft rotatably disposed on the main side plates, and an upper roller fixed on an upper roller shaft rotatably disposed between the main side plates.

14. The self mailing apparatus as claimed in claim 13, wherein the lower roller assembly comprises a pair of auxiliary rollers fixed on the pivot shaft between a pair of subplates which are disposed on the pivot shaft; and a lower roller disposed in front of the auxiliary rollers and fixed on a lower roller shaft rotatably disposed on the subplates; and wherein the upper roller is on the top of the first lower roller.

15. The self mailing apparatus as claimed in claim 14, wherein the lower roller assembly is spring loaded by a pair of springs disposed between the subplates and the main side plates.

16. The self mailing apparatus as claimed in claim 1, wherein the tabbing mechanism is disposed reversely to form a "Z" type tabbing mechanism, and the fourth driving means is operated bidirectionally to tab a "Z" folded media which is folded with leading and trailing edges opened.

17. The self mailing apparatus as claimed in any one of claims 1 to 16, further comprising a series of detecting means to provide signals through a microprocessor to form an operational sequence to accomplish precision system motion control.

18. A tab/label carrier for a self mailing apparatus as claimed in claim 1 comprising at least one row of equal spaced holes for pin feeding and a plurality of optically distinguishable marks deposited and distributed by equal distances on the carrier to form an unique feed back mechanism to provide an accurate tab/label motion control through a microprocessor, wherein each of the optically distinguishable mark is covered by a tab/label.

* * * * *